Sept. 1, 1925.                                                   1,552,125
                            L. DOUGLAS
                         EDUCATIONAL TOY BOOK
                       Filed Aug. 30, 1923        3 Sheets-Sheet 1

Sept. 1, 1925.

L. DOUGLAS

EDUCATIONAL TOY BOOK

Filed Aug. 30, 1923  3 Sheets-Sheet 3

Inventor
Lester Douglas

By J.H. Bryant
Attorney

Patented Sept. 1, 1925.

1,552,125

UNITED STATES PATENT OFFICE.

LESTER DOUGLAS, OF NEW YORK, N. Y.

EDUCATIONAL TOY BOOK.

Application filed August 30, 1923. Serial No. 660,171.

*To all whom it may concern:*

Be it known that I, LESTER DOUGLAS, a citizen of the United States of America, residing at New York, in the county of New York and State of New York, have invented certain new and useful Improvements in Educational Toy Books, of which the following is a specification.

This invention relates to toy books, and has special reference to a toy book for young children having pictures therein for cutting out.

One important object of the invention is to provide an improved and novel toy book which will not only afford great amusement in cutting out of pictures, but will also train their minds to associate like shapes of objects.

Another important object of the invention is to provide a book of this description in which instructions will be given as to the appropriateness of illustrations to a text.

With the above and other objects in view, the invention consists in general of a novel toy book provided with pictures and a text, the text having blank spaces and the pictures being on leaves separate from the text to be cut out and placed in the appropriate blank spaces.

One example of such a toy book will now be described, the novel features will be specifically claimed, and one type of the book is illustrated in the accompanying drawings, wherein—

Figure 2:
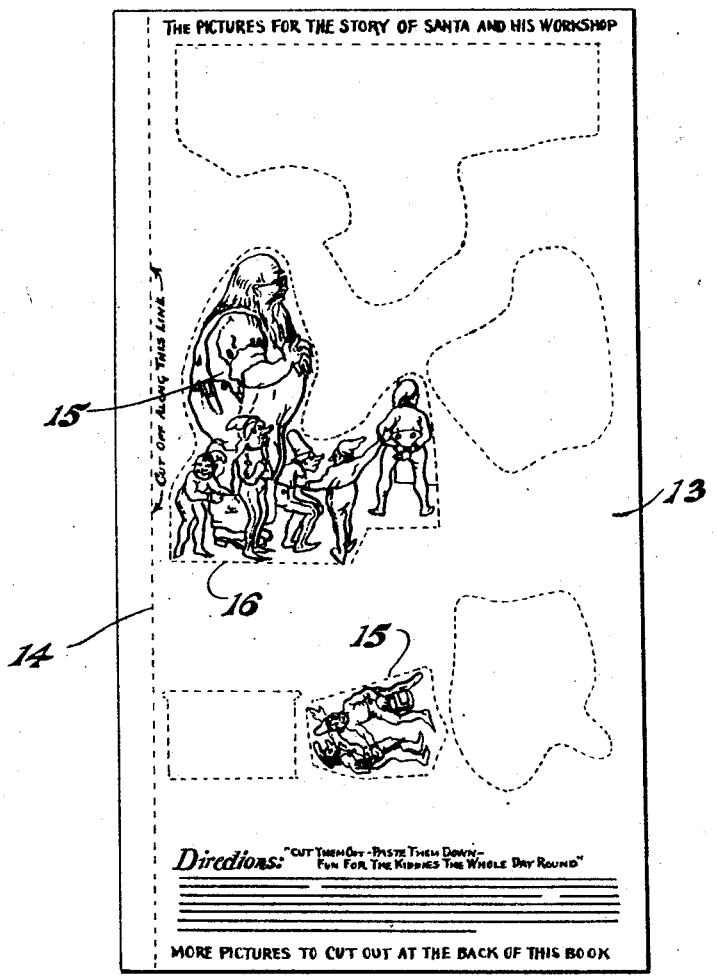
Fig. 2 is a detail view of a page in such a book, removed from the book and showing the illustrative character thereof.
Figure 3:
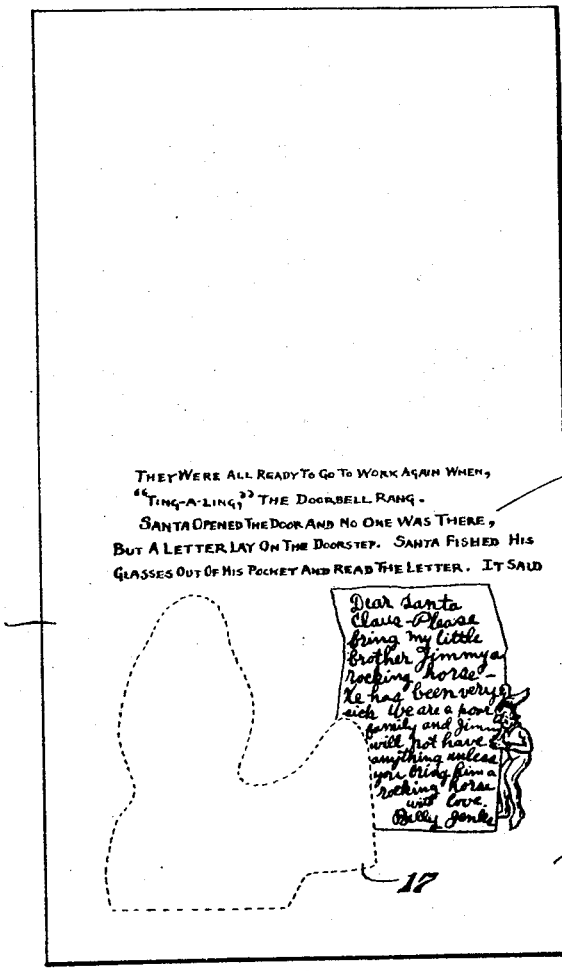
Fig. 3 is a view showing one of the text pages of such a book.

In the construction of this book, there is provided a series of pages 10, which are permanently bound, and on these pages is printed a text of one of the common stories appealing to children, such as a story about Santa Claus, or the like, this text being indicated at 11. Each of the pages 10 is provided with certain blank spaces 12. In connection with these pages there are also bound in the book other pages 13, and adjacent the binding these pages are provided each with a weakened line 14 so that the major portions of these pages may be detached. On the pages 13 are illustrations 15, and these illustrations are surrounded by contour lines 16 which give the general contour of the illustration. These contour lines are placed around the illustrations in order to enable small children to cut out the illustrations without great skill in the use of a scissors or a knife. Each of the blank spaces 12 on the pages 10 is also provided with a contour line 17, and it is to be observed that each of the illustrations has an individual contour line different from that of any of the other illustrations, and that the contour line 17 corresponds in size and shape to the contour line 16 of the specific or particular illustrations. The purpose of this will be understood especially by reference to Figures 2 and 3. In these two figures it will be seen that one of the illustrations therein has the contour line 16 exactly corresponding to the contour line 17 of Fig. 3, and that the portion of text 11 on the page shown in Fig. 3 is such that when the illustration from Fig. 2 is placed therein, it will be appropriate for what is shown in the text.

Now it will be seen from this that since there is but one contour line on the pages 10 corresponding to the specific contour line on the pages 13, the child will have to match up the cut out pictures with the various contour lines in the text until one is found that fits. The picture may then be pasted down on the page 10 at this point and eventually the child will have illustrated the text by the various pictures. It will be noted that this not only affords amusement for the child, all children delighting to cut out pictures, but trains the child in matching shapes. Furthermore, when a child has begun to read or when the text is read to it, it may be trained by this means into the selection of appropriate illustrations for the different passages of the text. As an example of the manner in which this may be used, the text may be read by or to the child, and then it may pick out what it deems an appropriate illustration for this part of the text from the pictures. Then by comparing the outlines it will be possible for the child itself to see whether it has picked out the proper picture or not.

Figure 1:
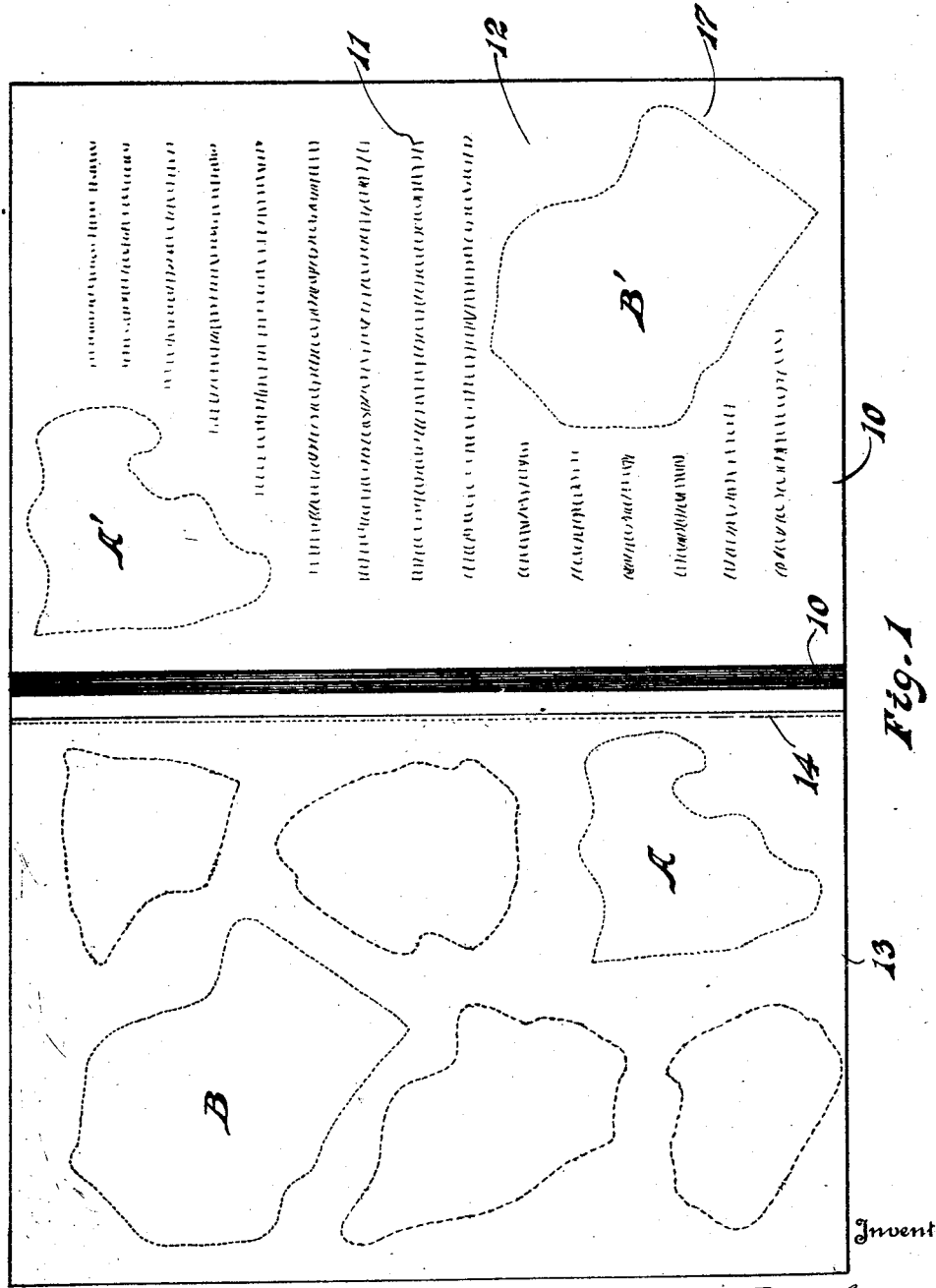
Fig. 1 shows a book of this description opened to disclose one of the pages for cutting out and one of the text pages.

By reference to Fig. 1 it will be seen, while the illustrations are not shown inside of the contour lines, that the contour A of page 13 corresponds to the contour A' of page 12, and similarly the contours B and B' correspond. The remaining contours shown on page 13 are intended to correspond to similar contours on other pages 10.

There has thus been provided an amusing and instructive toy book for children.

It will be obvious that while there is here illustrated one particular text and one particular shape of book, the text may be varied at will and the pictures made to correspond therewith.

Having thus described the invention, what is claimed as new, is:

1. An educational book including a plurality of permanently bound pages having a story text thereon provided at intervals with blank spaces, and a plurality of other pages bound with the first mentioned pages and having weakened lines adjacent the binding to permit ready detachment of the main portions of said pages, the last mentioned pages having complete picture units thereon for cutting out and insertion in the appropriate blank spaces of the first pages to illustrate the adjacent portion of the story text.

2. An educational book including a plurality of permanently bound pages having a story text thereon provided at intervals with blank spaces, and a plurality of other pages bound with the first mentioned pages and having weakened lines adjacent the binding to permit ready detachment of the main portions of said pages, the last mentioned pages having complete picture units thereon for cutting out and insertion in the appropriate blank spaces of the first pages to illustrate the adjacent portion of the story text, each illustration having a line extending therearound conforming to the general contour of the illustration and the blank spaces of the first pages being provided with contour lines each corresponding to the contour line surrounding the illustration appropriate to the text adjacent the particular space.

In testimony whereof I affix my signature.

LESTER DOUGLAS.